US012118837B2

(12) United States Patent
Voznesensky et al.

(10) Patent No.: US 12,118,837 B2
(45) Date of Patent: Oct. 15, 2024

(54) RESPONDING TO AUTONOMOUS VEHICLE ERROR STATES

(71) Applicant: Uber Technologies, Inc., San Francisco, CA (US)

(72) Inventors: Michael Voznesensky, San Francisco, CA (US); Brent Goldman, San Francisco, CA (US); Mark Yen, San Francisco, CA (US); Leigh Hagestad, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/662,543

(22) Filed: May 9, 2022

(65) Prior Publication Data
US 2022/0262177 A1  Aug. 18, 2022

Related U.S. Application Data

(63) Continuation of application No. 16/739,904, filed on Jan. 10, 2020, now Pat. No. 11,354,949.
(Continued)

(51) Int. Cl.
*G07C 5/08* (2006.01)
*B60W 60/00* (2020.01)
(Continued)

(52) U.S. Cl.
CPC ..... *G07C 5/0816* (2013.01); *B60W 60/00253* (2020.02); *B60W 60/00256* (2020.02);
(Continued)

(58) Field of Classification Search
CPC ................. G07C 5/0816; G07C 5/008; B60W 60/00253; B60W 60/00256;
(Continued)

(56) References Cited

U.S. PATENT DOCUMENTS 9,817,400 B1 * 11/2017 Poeppel ................ H04L 67/306
11,354,949 B2   6/2022 Voznesensky et al.
(Continued)

OTHER PUBLICATIONS

U.S. Appl. No. 16/739,904, filed Jan. 10, 2020, Responding to Autonomous Vehicle Error States.
(Continued)

*Primary Examiner* — Aaron L Troost
(74) *Attorney, Agent, or Firm* — Schwegman Lundberg & Woessner, P.A.

(57) ABSTRACT

Various examples are directed to systems and methods for dispatching autonomous vehicles. A service arrangement system may receive error data describing an error state at a first autonomous vehicle executing a first transportation service. The first transportation service may include moving a payload from a transportation service start point to a transportation service end point. The service arrangement system may determine, using the error data, a first property of the first autonomous vehicle associated with the error state and select a second autonomous vehicle that does not have the first property. The service arrangement system may send to the second autonomous vehicle a transportation service request requesting that the second autonomous vehicle travel to a rendezvous location to meet the first autonomous vehicle and transport the payload from the rendezvous location to the transportation service end point.

18 Claims, 6 Drawing Sheets

Related U.S. Application Data

(60) Provisional application No. 62/791,489, filed on Jan. 11, 2019.

(51) Int. Cl.
*G01C 21/34* (2006.01)
*G05D 1/00* (2024.01)
*G06Q 10/0832* (2023.01)
*G06Q 10/0835* (2023.01)
*G07C 5/00* (2006.01)
*G08G 1/00* (2006.01)

(52) U.S. Cl.
CPC ....... *G01C 21/3453* (2013.01); *G05D 1/0291* (2013.01); *G06Q 10/0832* (2013.01); *G06Q 10/08355* (2013.01); *G07C 5/008* (2013.01); *G08G 1/202* (2013.01)

(58) Field of Classification Search
CPC ............... B60W 2556/50; G01C 21/34; G01C 21/3453; G05D 1/0287; G05D 1/0291; G06Q 10/0832; G06Q 10/08355; G08G 1/202; G08G 1/205
See application file for complete search history.

(56) References Cited

U.S. PATENT DOCUMENTS

| | | |
|---|---|---|
| 2005/0192749 A1 | 9/2005 | Flann et al. |
| 2018/0322775 A1* | 11/2018 | Chase ................... G06N 5/022 |
| 2018/0342035 A1 | 11/2018 | Sweeney et al. |
| 2019/0047584 A1* | 2/2019 | Donnelly ............ B60W 30/025 |
| 2019/0057312 A1 | 2/2019 | Li et al. |
| 2019/0080264 A1* | 3/2019 | Wasekura ............. G06Q 50/40 |
| 2020/0226857 A1 | 7/2020 | Voznesensky et al. |

OTHER PUBLICATIONS

"U.S. Appl. No. 16/739,904, Non Final Office Action mailed Oct. 18, 2021", 10 pgs.

"U.S. Appl. No. 16/739,904, Notice of Allowance mailed Feb. 9, 2022", 9 pgs.

"U.S. Appl. No. 16/739,904, Response filed Jan. 10, 2022 to Non Final Office Action mailed Oct. 18, 2021", 12 pgs.

* cited by examiner

RESPONDING TO AUTONOMOUS VEHICLE ERROR STATES

CLAIM FOR PRIORITY

This application is a continuation of and claims the benefit of priority of U.S. application Ser. No. 16/739,904, filed Jan. 10, 2020, which claims the benefit of priority of U.S. Application Ser. No. 62/791,489, filed Jan. 11, 2019, each of which is hereby incorporated by reference in its entirety.

FIELD

This document pertains generally, but not by way of limitation, to devices, systems, and methods for operating and/or managing autonomous vehicles and, more particularly, to responding to autonomous vehicle error states.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
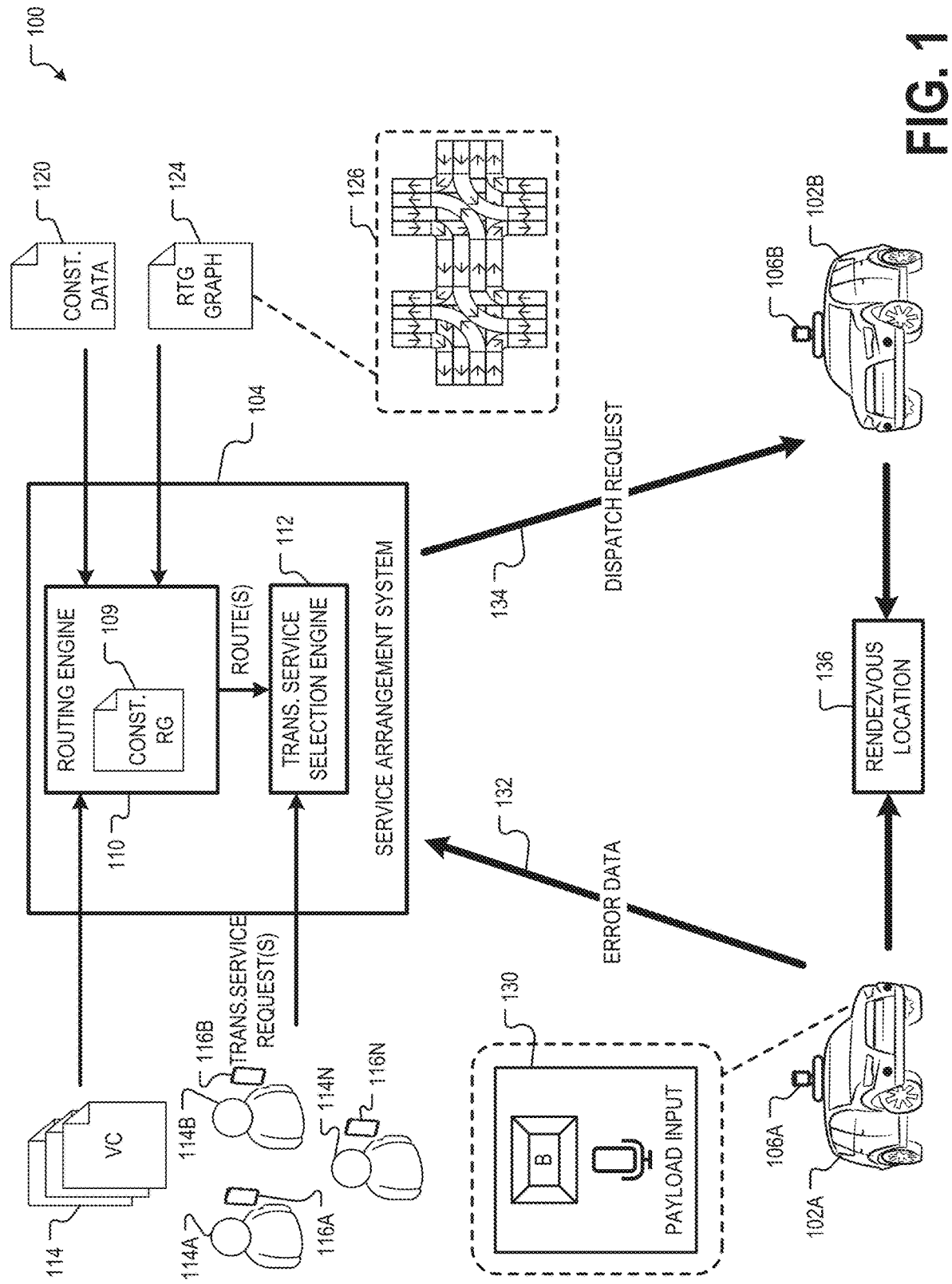
FIG. 1 is a diagram showing one example of an environment for responding to autonomous vehicle error states.

Examples described herein are directed to systems and methods for responding to autonomous vehicle error states. Various examples use a service arrangement system to manage a plurality of autonomous vehicles, including autonomous vehicles of different types having different capabilities. The service arrangement system receives transportation service requests from system users. A transportation service may be a service that involves transporting people and/or cargo. In some examples, a transportation service includes picking up a human passenger, transporting the human passenger, and dropping the human passenger off at a desired location. In other examples, a transportation service includes picking up cargo, such as food, packages, etc., transporting the cargo, and dropping the cargo off at a desired location.

When the service arrangement system receives a transportation service request, it selects an autonomous vehicle to execute the transportation service and offers the transportation service to the selected autonomous vehicle. The selected autonomous vehicle can accept the transportation service and begin to execute it.

To execute a transportation service, the autonomous vehicle uses an on-board vehicle autonomy system to provide inputs to vehicle controls that tend to move the autonomous vehicle along a route for the transportation service. In an autonomous or semi-autonomous vehicle (collectively referred to as an autonomous vehicle (AV)), the vehicle autonomy system, sometimes referred to as an AV stack, controls one or more of braking, steering, or throttle of the vehicle. In a fully-autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle.

An autonomous vehicle can experience an error state that prevents the autonomous vehicle from completing a transportation service. An error state occurs when the vehicle autonomy system fails to provide control inputs for completing a transportation service. Error states can have various causes including, for example, roadway or other environmental conditions, passenger or payload discomfort, a crash or other failure of the vehicle autonomy system, a mechanical failure of the vehicle, etc.

When a first autonomous vehicle experiences an error state while executing a transportation service, the service arrangement system is programmed to dispatch a second autonomous vehicle to complete the transportation service. The second autonomous vehicle can be dispatched to a rendezvous location where it meets the first autonomous vehicle. The second autonomous vehicle picks up passengers and/or other payload from the first autonomous vehicle and traverses from the rendezvous location to a transportation service end point of the initial transportation service.

When a passenger or other payload experiences an error state at an autonomous vehicle, it may be desirable to provide that passenger or payload with a second autonomous vehicle that can complete the requested transportation service without also experiencing an error state. For example, the delay and inconvenience of waiting for a second vehicle to complete a transportation service may already cause the passenger or payload proprietor be ill-disposed towards the operator of the service arrangement system. Additional delays or inconveniences at that point may be even more damaging.

The service arrangement system can be programmed to address these and other issues by determining at least one property of the first autonomous vehicle that contributed to the error state. The service arrangement system selects a second autonomous vehicle that does not have the at least one property associated with the error state. In this way, the likelihood of the second autonomous vehicle experiencing a similar error state is reduced.

Consider an example in which a first autonomous vehicle experiences an error state upon encountering a roadway blockage, such as a double-parked vehicle. The service arrangement system can determine at least one property of the first autonomous vehicle that contributed to the error state. For example, the first autonomous vehicle may have a localization tolerance that makes it difficult for the first autonomous vehicle to navigate in tight places. The service arrangement system can select a second autonomous vehicle that has a smaller localization tolerance and/or is otherwise better able to navigate in tight places, such as around the roadway blockage.

There are a number of different ways that the service arrangement system can identify a vehicle property of the first autonomous vehicle that contributed to the error state. In some examples, the service arrangement system receives error data describing the error state. The error data can be provided by the autonomous vehicle experiencing the error state, for example. The error data can include a description of the error state and, in some examples, an indication of a location where the error state occurred. The service arrangement system associates the location with a roadway location and identifies a vehicle property of the first autonomous vehicle related to the roadway location. Referring back to the example above, the service arrangement system may determine that an obstacle was present at the roadway location and that the first autonomous vehicle had a localization tolerance or other property that makes it difficult for the first autonomous vehicle to maneuver around unexpected obstacles.

In some examples, the vehicle autonomy system utilizes routing information to identify the vehicle property contributing to the error state. For example, a routing engine can be used to generate routes for autonomous vehicles utilizing a routing graph. The routing graph represents roadways as a set of interconnected route components. Different route components, or transitions between route components, are associated with corresponding costs. The routing engine determines a vehicle route, for example, by selecting the lowest-cost combination of connected route components. In some examples, the routing engine applies constraints to the routing graph to generate a constrained routing graph. The constraints include changes to the cost, connectivity, etc. of the routing graph based, for example, on current roadway conditions, policies, and vehicle capabilities.

In some examples, the service arrangement system uses information about the location of the error state and determines one or more route components at or near the location. The service arrangement system determines a cost for the route component or components for the first vehicle. In this example, the cost can be the property of the first vehicle that contributed to the error state. The determined cost, in some examples, is specific to the first vehicle. For example, the determined cost may depend on a vehicle capability constraint and/or a policy constraint that is specific to autonomous vehicles of the same type as the first autonomous vehicle. The service arrangement system can select a second autonomous vehicle that has a lower cost for the route components or components.

In other examples, the property of the first autonomous vehicle is or includes an error rate. For example, the service arrangement system may access data indicating a rate at which the first autonomous vehicle (or autonomous vehicles of the same type as the first autonomous vehicle) experience error states. In some examples, the service arrangement system uses a rate specific to the type of error state experienced. For examples, if autonomous vehicles of a first type experience error states related to remote-detection sensor failure at a first rate, the service arrangement system may select a second autonomous vehicle of a type that experiences error states related to remote-detection sensor failure at a second rate lower than the first rate.

In some examples, the error state is associated with the passenger or other payload at the first autonomous vehicle. For example, the first autonomous vehicle can include a payload input such as a button, microphone, etc. by which a passenger can provide feedback about the operation of the first autonomous vehicle. If the passenger determines that the operation of the vehicle is unsafe, the passenger can trigger the error state by selecting the button, speaking into the microphone, etc. In some examples, the customer can also trigger the error state using a user computing device, as described herein. Also, in some examples in which the payload of the first autonomous vehicle is cargo instead of a passenger, the cargo may be associated with a sensor, such as an accelerometer. If the sensor detects that the payload has been subjected to motion outside of an indicated tolerance.

In some examples, the property of the first autonomous vehicle associated with the error state is a rate of complaint or a rate of a particular type of complaint by passengers or other users of autonomous vehicles of the same type as the first autonomous vehicle. Consider an example, in which passengers have a high rate of complaint about jerkiness in high speed corners for a type of autonomous vehicles including the first autonomous vehicle. If the error state is initiated by a passenger in a portion of roadway including a high speed corner, the service arrangement system can determine that the property associated with the error state is or includes the high complaint rate and a second autonomous vehicle is selected from a type of autonomous vehicle that has a lower complaint rate for jerkiness in high speed corners. In some examples, the service arrangement system selects the second autonomous vehicle from a type of vehicles having a complaint rate less than a reference rate. The reference rate can be, for example, the rate associated with the first autonomous vehicle or another rate.

In some examples, the service arrangement system selects the second autonomous vehicle considering payload preference data associated with passenger or proprietor of cargo carried by the first autonomous vehicle. For example, a passenger or owner of payload carried by autonomous vehicles can provide payload preference data describing a type of autonomous vehicle that the passenger or payload owner prefers. The service arrangement system may use this information to favor autonomous vehicles favored by the passenger or payload owner.

In some examples, the service arrangement system selects the second autonomous vehicle considering a quantity of service provided by the second autonomous vehicle and/or autonomous vehicles of the same type as the autonomous vehicle. For example, it may be desirable to provide a second autonomous vehicle that has a significant service record rather than a newer type of vehicle that has been less reliable. In some examples, the service arrangement system selects the second autonomous vehicle of a type that has more than a threshold quantity of service delivering payload (e.g., a threshold number of miles, a threshold number of transportation services, a threshold number of hours).

FIG. 1 is a diagram showing one example of an environment 100 for responding to autonomous vehicle error states.

The environment includes a service arrangement system 104, a first autonomous vehicle 102A, and a second autonomous vehicle 102B. In this example, the first autonomous vehicle 102A is dispatched on a transportation service by the service arrangement system 104 and experiences an error state during the transportation service. The second autonomous vehicle 102B is dispatched to a rendezvous location 136 to pick up a payload (e.g., passengers or cargo) and complete the transportation service originally dispatched to the first autonomous vehicle 102A.

The autonomous vehicles 102A, 102B can be passenger vehicles, such as trucks, cars, buses or other similar vehicles. The autonomous vehicles 102A, 102B can also include delivery vehicles, such as vans, trucks, tractor trailers, etc. The autonomous vehicles 102A, 102B are self-driving vehicles (SDVs) or autonomous vehicles (AVs). For example, each vehicle 102A, 102B includes a vehicle autonomy system, described in more detail with respect to FIG. 2, that is configured to operate some or all the controls of the vehicle 102A, 102B (e.g., acceleration, braking, steering).

In some examples, one or more of the autonomous vehicles 102A, 102B is operable in different modes where the vehicle autonomy system has differing levels of control over the vehicle 102A, 102E in different modes. Some autonomous vehicles 102A, 102B may be operable in a full autonomous mode in which the vehicle autonomy system has responsibility for all or most of the controls of the vehicle 102A, 102B. Some autonomous vehicles 102A, 102B may be operable in a semiautonomous mode that is in addition to or instead of the full autonomous mode. In a semiautonomous mode, the vehicle autonomy system of the vehicle 102A, 102B is responsible for some of the vehicle controls while a human user or driver is responsible for other vehicle controls. In some examples, one or more of the autonomous vehicles 102A, 102B is operable in a manual mode in which the human user is responsible for all control of the vehicle 102A, 102B. Additional details of an example vehicle autonomy system are provided herein with reference to FIG. 2.

The autonomous vehicles 102A, 102B include one or more remote detection sensor sets 106A, 106B. (Each vehicle 102A, 102B may have a respective remote detection sensor set although, for clarity, not all of the remote detection sensor sets 106A, 106B are individually labeled.) Remote detection sensor sets 106A, 106B include one or more sensors that receive return signals from the environment 100. Return signals may be reflected from objects in the environment 100, such as the ground, buildings, trees, etc. The remote-detection sensor sets 106A, 106B may include one or more active sensors, such as light imaging detection and ranging (LIDAR), radio detection and ranging (RADAR), and/or sound navigation and ranging (SONAR) that emit sound or electromagnetic radiation in the form of light or radio waves to generate return signals. Information about the environment 100 is extracted from the return signals. In some examples, the remote-detection sensor sets 106A, 106B include one or more passive sensors that receive return signals that originated from other sources of sound or electromagnetic radiation. Remote-detection sensor sets 106A, 106B provide remote-detection sensor data that describes the environment 100. The autonomous vehicles 102A, 102B can also include other types of sensors, for example, as described in more detail with respect to FIG. 2.

In the example environment 100, the autonomous vehicles 102A, 102B are of different vehicle types. In some examples, different types of autonomous vehicles 102A, 102B have different capabilities. For example, different types of autonomous vehicles 102A, 102B can have different vehicle autonomy systems. This can include, for example, vehicle autonomy systems created by different manufacturers or designers, vehicle autonomy systems having different software versions or revisions, etc. Also, in some examples, different types of autonomous vehicles 102A, 102B can have different remote-detection sensor sets 106A, 106B. For example, one type of autonomous vehicles 102A, 102B may include a LIDAR remote-detection sensor while another type of vehicle 102A, 102B may include stereoscopic cameras and omit a LIDAR remote-detection sensor. In some examples, different types of autonomous vehicles 102A, 102B can also have different mechanical particulars. For example, one type of vehicle may have all-wheel drive while another type may have front-wheel drive.

The service arrangement system 104 is programmed to assign transportation services to the autonomous vehicles 102A, 102B as described herein. The service arrangement system 104 can be or include one or more servers or other suitable computing devices. The service arrangement system 104 is configured to receive transportation service requests from one or more users 114A, 114B, 114N. Users 114A, 114B, 114N can make transportation service requests with user computing devices 116A, 116B, 116N. The user computing devices 116A, 116B, 116N can be or include any suitable computing device such as, for example, tablet computers, mobile telephone devices, laptop computers, desktop computers, etc. In some examples, user computing devices 116A, 116B, 116N execute an application associated with a transportation service implemented with the service arrangement system 104. The users 114A, 114B, 114N launch the application on the respective computing devices 116A, 116B, 116I and utilize functionality of the application to make transportation service requests.

The service arrangement system 104 comprises a transportation service selection engine 112 that is programmed to receive and process transportation service requests and a routing engine 110 that generates routes for candidate autonomous vehicles 102A, 102B to execute a requested transportation service. When the transportation service selection engine 112 receives a transportation service request, it identifies a set of candidate autonomous vehicles for executing the transportation service, which may include one or more of the autonomous vehicles 102A, 102B. The set of candidate autonomous vehicles can include autonomous vehicles that are best suited for executing the transportation service. For example, the set of candidate autonomous vehicles can include autonomous vehicles that are near to a transportation service start point. In some examples, candidate autonomous vehicles are limited to vehicles capable of executing the transportation service. For example, a transportation service that involves moving a large object may be executable only by autonomous vehicles having sufficient space to carry the large object.

The transportation service selection engine 112 provides an indication of the candidate autonomous vehicles 102A, 102B to the routing engine 110. The routing engine 110 generates candidate routes for some or all of the set of candidate autonomous vehicles 102A, 102B. The candidate routes are described by respective route costs. The transportation service selection engine 112 uses the candidate routes to select the autonomous vehicle 102A, 102B best suited to execute the route. For example, the candidate autonomous vehicle 102A, 102B best suited to execute the route may be the candidate autonomous vehicle 102A, 102B having the lowest cost route for the transportation service.

In this example, the transportation service selection engine 112 selects the autonomous vehicle 102A for a transportation service. The service arrangement system 104 sends a transportation service execution request to the autonomous vehicle 102A. In some examples, the autonomous vehicle 102A can accept or decline the transportation service. In this example, the autonomous vehicle accepts the transportation service and begins to traverse towards the transportation service start point to execute the transportation service.

The routing engine 110 generates routes utilizing, for example, a routing graph 124 in conjunction with constraint data such as, for example, vehicle capability data 114, and other constraint data 120, which may include policy data, vehicle capability data, operational constraint data, etc. The routing graph 124 is a representation of the roadways in a geographic area. The routing graph 124 can represent the roadways as a set of route components, which are sometimes also referred to as lane segments. In some examples, the routing graph 124 indicates directionality, connectivity, and cost for the various route components making up the roadways. Directionality indicates the direction of travel in a route component. Connectivity describes possible transitions between route components. Cost describes the cost for an autonomous vehicle 102A, 102B to traverse a route componen.

In FIG. 1, break-out window 126 shows example route components making up part of the routing graph 124. Route components in the break-out window 126 are illustrated as shapes with arrows indicating the directionality of the route components. Route components can be connected to one another according to their directionality.

The routing engine 110 is configured to utilize vehicle capability data 114 and/or other constraint data 120 to generate constrained routing graph data 109. Vehicle capability data 114 and other constraint data 120 indicate constraints that are applied to the routing graph to generate the constrained routing graph 109. Generally, a constraint includes a constraint property or set of constraint properties describing route components subject to the constraint and one or more routing graph modifications for implementing the constraint.

Routing graph modifications can include, for example, removing route components having the indicated property or properties from the routing graph, removing connections to route components having the indicated property or properties from the routing graph. Another example routing graph modification can include changing a cost associated with route component and/or transitions to the route component.

Costs may be changed up or down. For example, if constraint data indicates that route components having a particular property or set of properties are disfavored, the costs to traverse and/or transition to the route components can be increased. On the other hand, if constraint data indicates that route components having a particular constraint property or set of constraint properties are favored, the costs to traverse and/or transition to the route components can be decreased.

Routing graph modifications can relate to route components that have the indicated constraint property or properties. For example, if a policy constraint forbids routing a vehicle through route components that include or are in a school zone, a corresponding routing graph modification includes removing such school zone route components from the routing graph 124 and/or removing transitions to such school zone route components. Routing graph modifications can, in some examples, describe changes to route components other than those having the identified properties. Consider an example constraint that is to avoid cul-de-sacs. The associated routing graph modification could involve removing route components that include cul-de-sacs and also removing route components that do not include cul-de-sacs but can lead only to other route components that include cul-de-sacs.

Vehicle capability data 114 describes constraints associated with various autonomous vehicles 102A, 102B of different types. For example, the vehicle capability data 114 can be and/or be derived from vehicle capability data, sometimes also referred to as Operational Domain (OD) or operational domain data (ODD), if any, provided by the vehicle's manufacturer. As described herein, vehicle capability data 114 can be supplemented using transportation service result data to cause the vehicle capability data 114 to more closely match the actual performance of autonomous vehicles 102A, 102B of the various types. Constraints described by vehicle capability data 114 can include constraint data identifying a route segment property or properties (e.g., includes an unprotected left, is part of a controlled access highway) and routing graph modification data indicating what is to be done to route components having the indicated property or properties. For example, route components that a particular vehicle type is not capable of traversing can be removed from the routing graph or can have connectivity data modified to remove transitions to those route components. For example, the service arrangement system 104 can remove one or more connections to the route component. If the route component properties indicate a maneuver that is undesirable for a vehicle, but not forbidden, then the routing graph modification data can call for increasing the cost of an identified route component or transitions thereto.

Other constraint data 120 can describe other constraints utilized to generate the constrained routing graph 109. For example, other constraint data 120 can include policy constraints. Policy constraints include route component properties that identify route components subject to a policy constraint and corresponding routing graph modifications. Policy constraints refer to types of route segments that it is desirable for a vehicle to avoid or prioritize. An example policy constraint is to avoid route components that are in or pass through school zones. Another example policy constraint is to avoid routing vehicles in residential neighborhoods. Yet another example policy constraint is to favor routing vehicles on controlled-access highways, if available. Policy constraints can apply to some vehicles, some vehicle types, all vehicles, or all vehicle types.

In some examples, other constraint data 120 also describes operational constraints. An operational constraint can include a set of route component properties and associated routing graph modifications. Operational constraints can be based, for example, on the state of one or more roadways. For example, if a roadway is to be closed for a parade or for construction, an operational constraint identifies properties (e.g., names or locations) of route segments that are part of the closure and an associated routing graph modification (e.g., removing the route components, removing transitions to the route components, etc.).

The routing engine 110 applies constraint data 120 to generate a constrained routing graph 109. The constrained routing graph 109 is used to generate a route for an autonomous vehicle 102A, 102B. (in some examples, different constrained routing graphs 109 are generated for different types of autonomous vehicles 102A, 102B.) The routing engine 110 determines a route for an autonomous vehicle 102A, 102B, for example, by applying a path planning algorithm to the constrained routing graph 109 to find the lowest cost route for the vehicle. Any suitable path planning algorithm can be used, such as, for example, A*, D*, Focused D*, D* Lite, GD*, or Dijkstra's algorithm. A generated route can include a string of connected route components between a vehicle start point and a vehicle end point. A vehicle start point is an initial route component of a route. A vehicle end point is a last route component of a route. In some examples, the vehicle start point is a current location of the relevant autonomous vehicle 102A, 102B and the vehicle end point is the end point for the requested transportation service. For example, on the route, the autonomous vehicle 102A, 102B can travel from its current location, to the transportation service start point, and then proceed to the transportation service end point traversing transportation service waypoints (if any) along the way.

In the example of FIG. 1, a transportation service is dispatched to the autonomous vehicle 102A of a first type. The autonomous vehicle 102A experiences an error state. The error state can be caused in any suitable manner. In some examples, the autonomous vehicle 102A detects an error onboard. For example, if the vehicle autonomy system is in a situation in which it is unable to generate a suitable motion plan for the autonomous vehicle 102A, it may trigger an error state. This may occur, for example, if there is an obstacle, such as a double-parked car, in the path of the autonomous vehicle 102A. In another example, if the vehicle autonomy system crashes, this may trigger an error state.

In another example, a passenger and/or cargo of the autonomous vehicle 102A triggers an error. For example, the autonomous vehicle 102A can include a payload input device 130 such as, for example, a button, a microphone, etc. A passenger can use a payload input device 130 to indicate an error state to the autonomous vehicle 102A. In other examples, a passenger can use a user computing device 116A, 116B, 116N to indicate an error state. Also, in some examples, payload input devices 130 can include an accelerometer or similar sensor that can detect, for example, acceleration or other motion at or in a passenger compartment or other areas of the autonomous vehicle 102A for payload. If the acceleration or other motion exceeds a threshold level, an error state is triggered.

When an error state is triggered, the autonomous vehicle 102A sends error data 132 to the service arrangement system 104. The error data 132 can include, for example, error type data indicating a type of the error. Error data 132 can also include a location where the error state was encountered. The service arrangement system 104 receives the error data 132 and determines a property of the first autonomous vehicle 102A associated with the error state.

The service arrangement system 104 selects the second autonomous vehicle 102B, for example, as described herein, considering the property of the first autonomous vehicle. The second autonomous vehicle 102B may be selected not to have the same property of the first autonomous vehicle. For example, if the property is a localization tolerance above a first value, the second autonomous vehicle 102B may be selected from a type of autonomous vehicles having a localization tolerance below the first value. If the property is a routing-associated cost for the autonomous vehicle 102A to traverse one or more route components at or around where the error state occurred, then the second autonomous vehicle 102B can be selected from a type of autonomous vehicle having a lower cost at some or all of the relevant route components. The service arrangement system 104 sends a dispatch request 134 to the second autonomous vehicle 102B. If the autonomous vehicle 102B declines the request, another autonomous vehicle can be selected. If the autonomous vehicle 102B accepts the request, then autonomous vehicle 102B is routed to the rendezvous location 136. The rendezvous location 136, in some examples, is a position where the autonomous vehicle 102A stopped after experiencing the error state. In other examples, (e.g., where the vehicle 102A remains capable of moving in the error state), the rendezvous location 136 can be a positioned agreed upon by the autonomous vehicles 102A, 102B and/or selected by the service arrangement system 104. For example, the service arrangement system 104 may instruct the autonomous vehicle 102A to travel to the rendezvous location 136.

Figure 2:
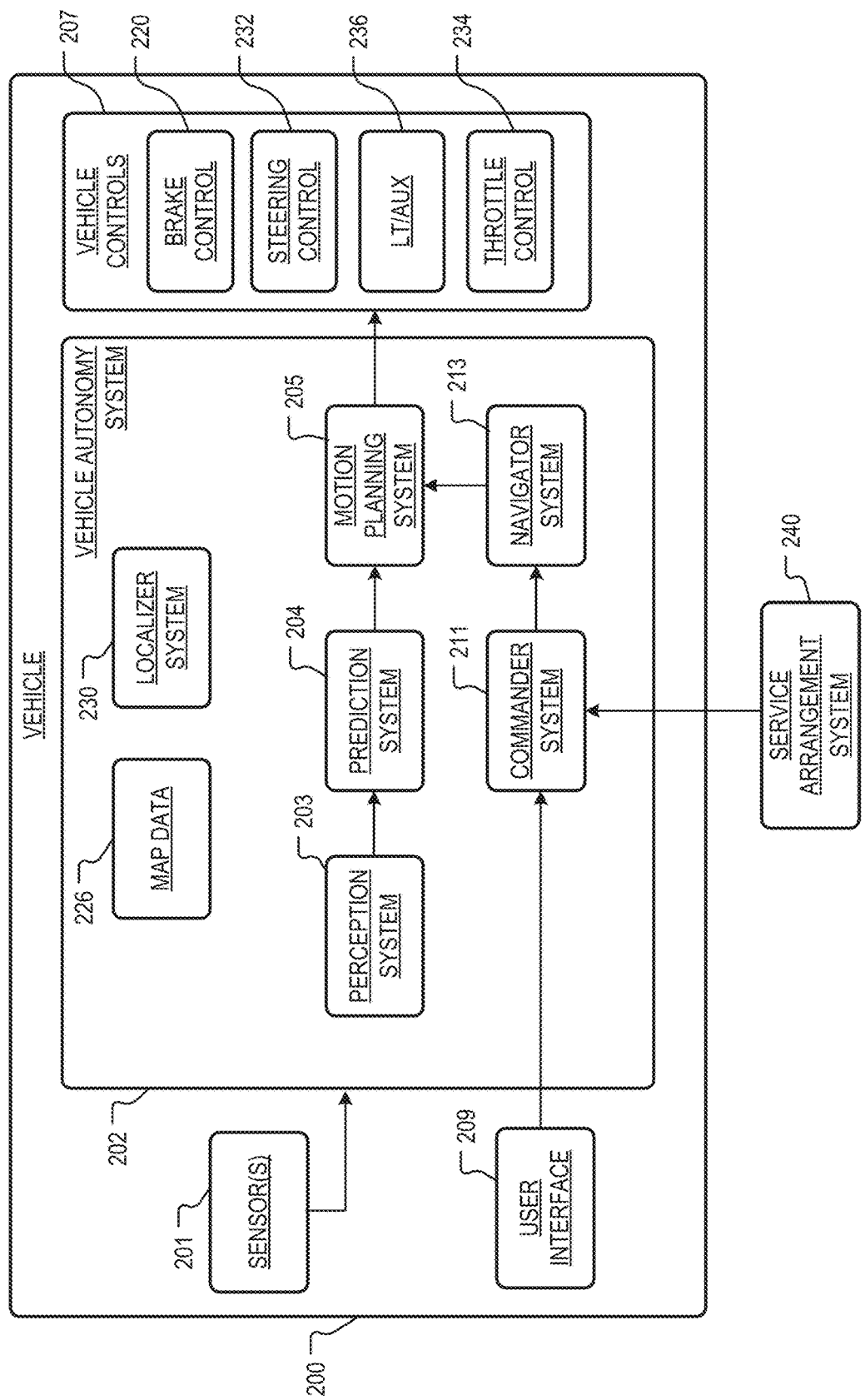
FIG. 2 depicts a block diagram of an example vehicle according to example aspects of the present disclosure.

FIG. 2 depicts a block diagram of an example vehicle 200 according to example aspects of the present disclosure. The vehicle 200 includes one or more sensors 201, a vehicle autonomy system 202, and one or more vehicle controls 207. The vehicle 200 is an autonomous vehicle, as described herein. The example vehicle 200 shows just one example arrangement of an autonomous vehicle. In some examples, autonomous vehicles of different types can have different arrangements.

The vehicle autonomy system 202 includes a commander system 211, a navigator system 213, a perception system 203, a prediction system 204, a motion planning system 205, and a localizer system 230 that cooperate to perceive the surrounding environment of the vehicle 200 and determine a motion plan for controlling the motion of the vehicle 200 accordingly.

The vehicle autonomy system 202 is engaged to control the vehicle 200 or to assist in controlling the vehicle 200, In particular, the vehicle autonomy system 202 receives sensor data from the one or more sensors 201, attempts to comprehend the environment surrounding the vehicle 200 by performing various processing techniques on data collected by the sensors 201, and generates an appropriate route through the environment. The vehicle autonomy system 202 sends commands to control the one or more vehicle controls 207 to operate the vehicle 200 according to the route.

Various portions of the vehicle autonomy system 202 receive sensor data from the one or more sensors 201. For example, the sensors 201 may include remote-detection sensors as well as motion sensors such as an inertial measurement unit (IMU), one or more encoders, or one or more odometers. The sensor data includes information that describes the location of objects within the surrounding environment of the vehicle 200, information that describes the motion of the vehicle 200, etc.

The sensors 201 may also include one or more remote-detection sensors or sensor systems, such as a LIDAR, a RADAR, one or more cameras, etc. As one example, a LIDAR system of the one or more sensors 201 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 201 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 201 may generate sensor data (e.g., remote-detection sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 201 can include a positioning system. The positioning system determines a current position of the vehicle 200. The positioning system can be any device or circuitry for analyzing the position of the vehicle 200. For example, the positioning system can determine a position by using one or more of inertial sensors, a satellite positioning system such as a Global Positioning System (GPS), based on IF address, by using triangulation and/or proximity to network access points or other network components (e.g., cellular towers, Win access points) and/or other suitable techniques. The position of the vehicle 200 can be used by various systems of the vehicle autonomy system 202.

Thus, the one or more sensors 201 are used to collect sensor data that includes information that describes the location (e.g., in three-dimensional space relative to the vehicle 200) of points that correspond to objects within the surrounding environment of the vehicle 200. In some implementations, the sensors 201 can be positioned at various different locations on the vehicle 200. As an example, in some implementations, one or more cameras and/or LIDAR sensors can be located in a pod or other structure that is mounted on a roof of the vehicle 200 while one or more RADAR sensors can be located in or behind the front and/or rear bumper(s) or body panels) of the vehicle 200. As another example, camera(s) can be located at the front or rear bumper(s) of the vehicle 200. Other locations can be used as well.

The localizer system 230 receives some or all of the sensor data from sensors 201 and generates vehicle poses for the vehicle 200. A vehicle pose describes a position and attitude of the vehicle 200. The vehicle pose (or portions thereof) can be used by various other components of the vehicle autonomy system 202 including, for example, the perception system 203, the prediction system 204, the motion planning system 205 and the navigator system 213.

The position of the vehicle 200 is a point in a three-dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis, and a roll about a second horizontal axis. In some examples, the localizer system 230 generates vehicle poses periodically (e.g., every second, every half second). The localizer system 230 appends time stamps to vehicle poses, where the time stamp for a pose indicates the point in time that is described by the pose. The localizer system 230 generates vehicle poses by comparing sensor data (e.g., remote-detection sensor data) to map data 226 describing the surrounding environment of the vehicle 200.

In some examples, the localizer system 230 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 230 generates vehicle poses.

Accordingly, the pose filter generates some vehicle poses by extrapolating from a previous pose estimate utilizing motion sensor data.

Vehicle poses and/or vehicle positions generated by the localizer system 230 are provided to various other components of the vehicle autonomy system 202. For example, the commander system 211 may utilize a vehicle position to determine whether to respond to a call from a service arrangement system 240.

The commander system 211 determines a set of one or more target locations that are used for routing the vehicle 200. The target locations are determined based on user input received via a user interface 209 of the vehicle 200. The user interface 209 may include and/or use any suitable input/output device or devices. In some examples, the commander system 211 determines the one or more target locations considering data received from the service arrangement system 240. The service arrangement system 240 is programmed to provide instructions to multiple vehicles, for example, as part of a fleet of vehicles for moving passengers and/or cargo. Data from the service arrangement system 240 can be provided via a wireless network, for example.

The navigator system 213 receives one or more target locations from the commander system 211 and map data 226. Map data 226, for example, provides detailed information about the surrounding environment of the vehicle 200. Map data 226 provides information regarding identity and location of different roadways and segments of roadways (e.g., lane segments or route components). A roadway is a place where the vehicle 200 can drive and may include, for example, a road, a street, a highway, a lane, a parking lot, or a driveway. Routing graph data is a type of map data 226.

From the one or more target locations and the map data 226, the navigator system 213 generates route data describing a route for the vehicle to take to arrive at the one or more target locations. In some implementations, the navigator system 213 determines route data using one or more path planning algorithms based on costs for route components, as described herein. For example, a cost for a route can indicate a time of travel, risk of danger, or other or other factor associated with adhering to a particular candidate route. For example, the reward can be of a sign opposite to that of cost. Route data describing a route is provided to the motion planning system 205, which commands the vehicle controls 207 to implement the route or route extension, as described herein. The navigator system 213 can generate routes as described herein using a general purpose routing graph and constraint data. Also, in examples where route data is received from a service arrangement system, that route data can also be provided to the motion planning system 205.

The perception system 203 detects objects in the surrounding environment of the vehicle 200 based on sensor data, map data 226, and/or vehicle poses provided by the localizer system 230. For example, map data 226 used by the perception system describes roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 202 in comprehending and perceiving its surrounding environment and its relationship thereto.

In some examples, the perception system 203 determines state data for one or more of the objects in the surrounding environment of the vehicle 200. State data describes a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 200; minimum path to interaction with the vehicle 200; minimum time duration to interaction with the vehicle 200; and/or other state information.

In some implementations, the perception system 203 determines state data for each object over a number of iterations. In particular, the perception system 203 updates the state data for each object at each iteration. Thus, the perception system 203 detects and tracks objects, such as other vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 generates prediction data associated with one or more of the objects detected by the perception system 203. In some examples, the prediction system 204 generates prediction data describing each of the respective objects detected by the prediction system 204.

Prediction data for an object is indicative of one or more predicted future locations of the object. For example, the prediction system 204 may predict where the object will be located within the next 5 seconds, 20 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203.

In some examples, the prediction system 204 also considers one or more vehicle poses generated by the localizer system 230 and/or map data 226.

In some examples, the prediction system 204 uses state data indicative of an object type or classification to predict a trajectory for the object. As an example, the prediction system 204 can use state data provided by the perception system 203 to determine that a particular object (e.g., an object classified as a vehicle) approaching an intersection and maneuvering into a left-turn lane intends to turn left. In such a situation, the prediction system 204 predicts a trajectory (e.g., path) corresponding to a left-turn for the vehicle 200 such that the vehicle 200 turns left at the intersection. Similarly, the prediction system 204 determines predicted trajectories for other objects, such as bicycles, pedestrians, parked vehicles, etc. The prediction system 204 provides the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object, and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 commands the vehicle controls based at least in part on the predicted trajectories associated with the objects within the surrounding environment of the vehicle 200, the state data for the objects provided by the perception system 203, vehicle poses provided by the localizer system 230, map data 226, and route or route extension data provided by the navigator system 213. Stated differently, given information about the current locations of objects and/or predicted trajectories of objects within the surrounding environment of the vehicle 200, the motion planning system 205 determines control commands for the vehicle 200 that best navigate the vehicle 200 along the route or route extension relative to the objects at such locations and their predicted trajectories on acceptable roadways.

In some implementations, the motion planning system 205 can also evaluate one or more cost functions and/or one or more reward functions for each of one or more candidate control commands or sets of control commands for the vehicle 200. Thus, given information about the current locations and/or predicted future locations/trajectories of objects, the motion planning system 205 can determine a total cost (e.g., a sum of the cost(s) and/or rewards) provided by the cost function(s) and/or reward function(s)) of adhering to a particular candidate control command or set of control commands. The motion planning system 205 can select or determine a control command or set of control commands for the vehicle 200 based at least in part on the cost function(s) and the reward function(s). For example, the motion plan that minimizes the total cost can be selected or otherwise determined.

In some implementations, the motion planning system 205 can be configured to iteratively update the route or route extension for the vehicle 200 as new sensor data is obtained from one or more sensors 201. For example, as new sensor data is obtained from one or more sensors 201, the sensor data can be analyzed by the perception system 203, the prediction system 204, and the motion planning system 205 to determine the motion plan.

The motion planning system 205 can provide control commands to one or more vehicle controls 207. For example, the one or more vehicle controls 207 can include throttle systems, brake systems, steering systems, and other control systems, each of which can include various vehicle controls (e.g., actuators or other devices that control gas flow, steering, braking) to control the motion of the vehicle 200. The various vehicle controls 207 can include one or more controllers, control devices, motors, and/or processors.

The vehicle controls 207 includes a brake control module 220. The brake control module 220 is configured to receive a braking command and bring about a response by applying (or not applying) the vehicle brakes. In some examples, the brake control module 220 includes a primary system and a secondary system. The primary system receives braking commands and, in response, brakes the vehicle 200. The secondary system may be configured to determine a failure of the primary system to brake the vehicle 200 in response to receiving the braking command.

A steering control system 232 is configured to receive a steering command and bring about a response in the steering mechanism of the vehicle 200. The steering command is provided to a steering system to provide a steering input to steer the vehicle 200.

A lighting/auxiliary control module 236 receives a lighting or auxiliary command. In response, the lighting/auxiliary control module 236 controls a lighting and/or auxiliary system of the vehicle 200. Controlling a lighting system may include, for example, turning on, turning off, or otherwise modulating headlines, parking lights, running lights, etc. Controlling an auxiliary system may include, for example, modulating windshield wipers, a defroster, etc.

A throttle control system 234 is configured to receive a throttle command and bring about a response in the engine speed or other throttle mechanism of the vehicle. For example, the throttle control system 234 can instruct an engine and/or engine controller, or other propulsion system component to control the engine or other propulsion system of the vehicle 200 to accelerate, decelerate, or remain at its current speed.

Each of the perception system 203, the prediction system 204, the motion planning system 205, the commander system 211, the navigator system 213, and the localizer system 230, can be included in or otherwise be a part of a vehicle autonomy system 202 configured to control the vehicle 200 based at least in part on data obtained from one or more sensors 201. For example, data obtained by one or more sensors 201 can be analyzed by each of the perception system 203, the prediction system 204, and the motion planning system 205 in a consecutive fashion in order to control the vehicle 200. While FIG. 2 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 202 includes one or more computing devices, which may implement all or parts of the perception system 203, the prediction system 204, the motion planning system 205 and/or the localizer system 230. Descriptions of hardware and software configurations for computing devices to implement the vehicle autonomy system 202 and/or vehicle autonomy system 104 are provided herein at FIGS. 5 and 6.

Figure 3:
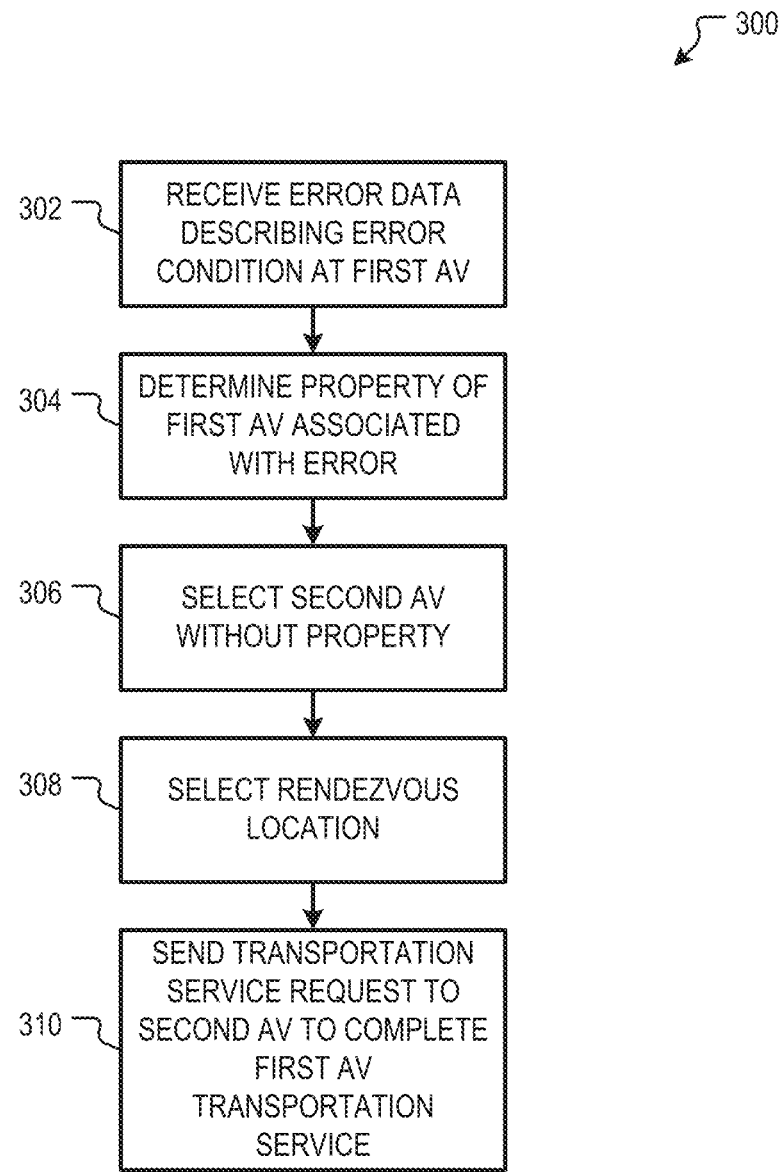
FIG. 3 is a flowchart showing one example of a process flow that can be executed by the service arrangement system of FIG. 1 to respond to an error state at a first autonomous vehicle.

FIG. 3 is a flowchart showing one example of a process flow 300 that can be executed by the service arrangement system 104 of FIG. 1 to respond to an error state at a first autonomous vehicle 102A. At operation 302, the service arrangement system 104 receives error data describing an error condition at a first autonomous vehicle 102A. The error data can include, for example, error type data indicating a type of the error. Example error types include, for example, a vehicle autonomy system error, a mechanical error (e.g., flat tire), and/or a payload indicated error. Error data also indicates a location where the error occurred.

At operation 304, the service arrangement system 104 determines at least one property of the first autonomous vehicle 102A that is associated with the error. For example, if the error type indicates that the error was caused by the vehicle autonomy system, or a component thereof, the vehicle property may be or include a type, version, or other descriptor of the vehicle autonomy system or component thereof at the first vehicle. In another example, if the error type indicates a mechanical failure, the vehicle property may be a make or model of the vehicle, or a component type (e.g., brake type, suspension type, etc.).

At operation 306, the service arrangement system 104 selects a second autonomous vehicle 102B that lacks the property or properties identified at operation 304. In this way, the second autonomous vehicle 102B may be less likely to experience the same error experienced by the first autonomous vehicle 102A. It will be appreciated that the property or properties identified at operation 304 may be stated positively or negatively. For example, the property determined at operation 304 may be a lack of a particular component (e.g., a lack of air shocks, a lack of a vehicle autonomy system capable of executing unprotected lefts, etc.). Accordingly, selecting a vehicle that lacks such a property may include selecting a vehicle that has the omitted thing (e.g., a vehicle that has air shocks, a vehicle that has a vehicle autonomy system capable of unprotected lefts, etc.).

At operation 308, the service arrangement system 104 selects a rendezvous location. As described herein, the rendezvous location can be a position where the first autonomous vehicle 102A stopped after experiencing the error state or, if the first vehicle remains capable of moving in the error state, another suitable location.

Figure 4:
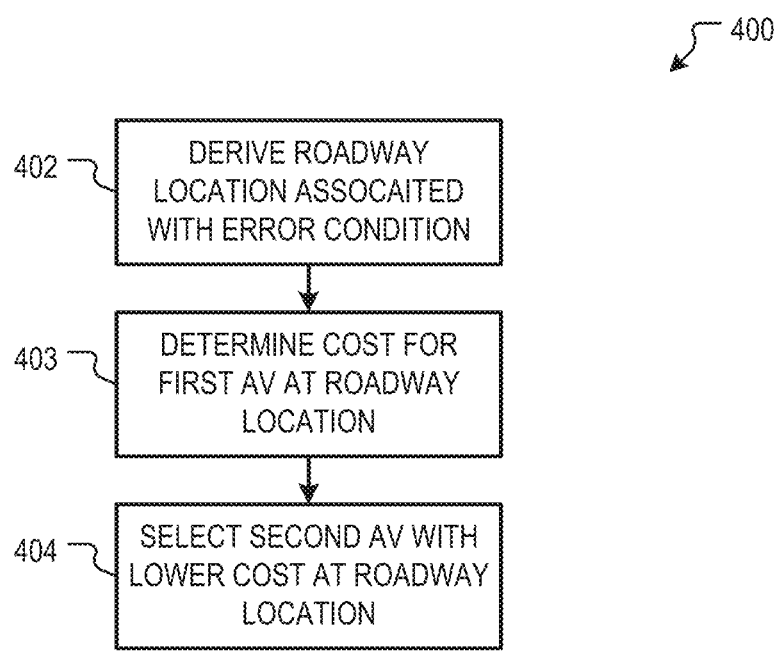
FIG. 4 is a flowchart showing one example of a process flow that can be executed by the service arrangement system of FIG. 1 to select a second autonomous vehicle without an autonomous vehicle property associated with an error state by considering routing costs.

At operation 310, the service arrangement system 104 sends a transportation service request to the second autonomous vehicle 102B. The transportation service request describes a transportation service that includes picking up the payload of the first autonomous vehicle 102A at the rendezvous location and transporting the payload to the transportation service end point attempted by the first autonomous vehicle 102A. In some examples, the second autonomous vehicle 102B may accept or decline the transportation service request. If the second autonomous vehicle 102B declines the request, the service arrangement system 104 may select a third autonomous vehicle lacking the property identified at operation 304) and offer the transportation service for completing that of the first autonomous vehicle 102A to the third autonomous vehicle FIG. 4 is a flowchart showing one example of a process flow 400 that can be executed by the service arrangement system 104 of FIG. 1 to select a second autonomous vehicle 102B without an autonomous vehicle property associated with an error state by considering routing costs. At operation 402, the service arrangement system 104 derives a roadway location associated with an error condition experienced by the first autonomous vehicle 102A. The roadway location can include one route component or multiple route components. In some examples, the identified roadway location is indicated by error data received from the first autonomous vehicle 102A.

At operation 403, the service arrangement system 104 determines a cost to the first autonomous vehicle 102A for the first roadway location. For example, the routing engine 110 may use routing constraints for the first autonomous vehicle 102A to traverse the roadway location. At operation 404, the service arrangement system 104 selects the second autonomous vehicle 102B by finding an autonomous vehicle having a lower cost to traverse the roadway location. The lower cost associated with the second autonomous vehicle 102B may indicate that the second autonomous vehicle 102B is less likely to experience the error condition experienced by the first autonomous vehicle 102A. A transportation service to complete the transportation service begun by the first autonomous vehicle 102A may be offered to the second autonomous vehicle 102B, as described herein.

Figure 5:
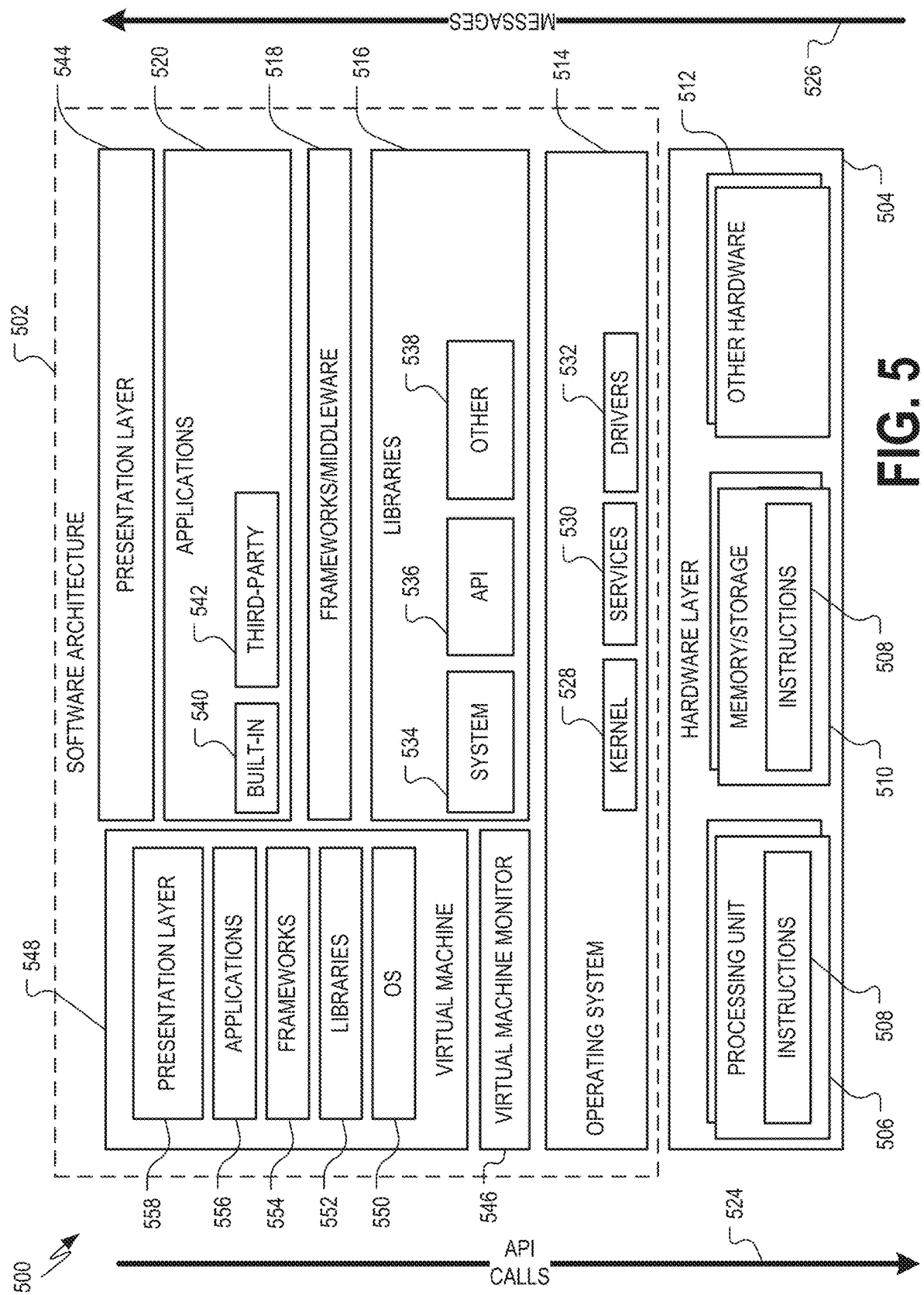
FIG. 5 is a block diagram showing one example of a software architecture for a computing device.

FIG. 5 is a block diagram 500 showing one example of a software architecture 502 for a computing device. The software architecture 502 may be used in conjunction with various hardware architectures, for example, as described herein. FIG. 5 is merely a non-limiting example of a software architecture 502 and many other architectures may be implemented to facilitate the functionality described herein. A representative hardware layer 504 is illustrated and can represent, for example, any of the above-referenced computing devices. In some examples, the hardware layer 504 may be implemented according to an architecture 600 of FIG. 6 and/or the software architecture 502 of FIG. 5.

The representative hardware layer 504 comprises one or more processing units 506 having associated executable instructions 508. The executable instructions 508 represent the executable instructions of the software architecture 502, including implementation of the methods, modules, components, and so forth of FIGS. 1-5. The hardware layer 504 also includes memory and/or storage modules 510, which also have the executable instructions 508. The hardware layer 504 may also comprise other hardware 512, which represents any other hardware of the hardware layer 504, such as the other hardware illustrated as part of the architecture 600.

In the example architecture of FIG. 5, the software architecture 502 may be conceptualized as a stack of layers where each layer provides particular functionality. For example, the software architecture 502 may include layers such as an operating system 514, libraries 516, frameworks/middleware 518, applications 520, and a presentation layer 544. Operationally, the applications 520 and/or other components within the layers may invoke API calls 524 through the software stack and receive a response, returned values, and so forth illustrated as messages 526 in response to the API calls 524. The layers illustrated are representative in nature and not software architectures have all layers. For example, some mobile or special-purpose operating systems may not provide a frameworks/middleware 518 layer, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. In some examples, the services 530 include an interrupt service. The interrupt service may detect the receipt of a hardware or software interrupt and, in response, cause the software architecture 502 to pause its current processing and execute an TSR when an interrupt is received. The TSR may generate an alert.

The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 516 may provide a common infrastructure that may be used by the applications 520 and/or other components and/or layers. The libraries 516 typically provide functionality that allows other software modules to perform tasks in an easier fashion than by interfacing directly with the underlying operating system 514 functionality (e.g., kernel 528, services 530, and/or drivers 532). The libraries 516 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be used by the applications 520 and/or other software components/modules. For example, the frameworks 518 may provide various graphical user interface (GUI) functions, high-level resource management, high-level location services, and so forth. The frameworks 518 may provide a broad spectrum of other APIs that may be used by the applications 520 and/or other software components/modules, some of which may be specific to a particular operating system or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. The third-party applications 542 may include any of the built-in applications 540 as well as a broad assortment of other applications. In a specific example, the third-party application 542 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 542 may invoke the API calls 524 provided by the mobile operating system such as the operating system 514 to facilitate functionality described herein.

The applications 520 may use built-in operating system functions (e.g., kernel 528, services 530, and/or drivers 532), libraries (e.g., system libraries 534, API libraries 536, and other libraries 538), or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 5, this is illustrated by a virtual machine 548. A virtual machine creates a software environment where applications/modules can execute as if they were executing on a hardware computing device. The virtual machine 548 is hosted by a host operating system (e.g., the operating system 514) and typically, although not always, has a virtual machine monitor 546, which manages the operation of the virtual machine 548 as well as the interface with the host operating system (e.g., the operating system 514). A software architecture executes within the virtual machine 548, such as an operating system 550, libraries 552, frameworks/middleware 554, applications 556, and/or a presentation layer 558. These layers of software architecture executing within the virtual machine 548 can be the same as corresponding layers previously described or may be different.

Figure 6:
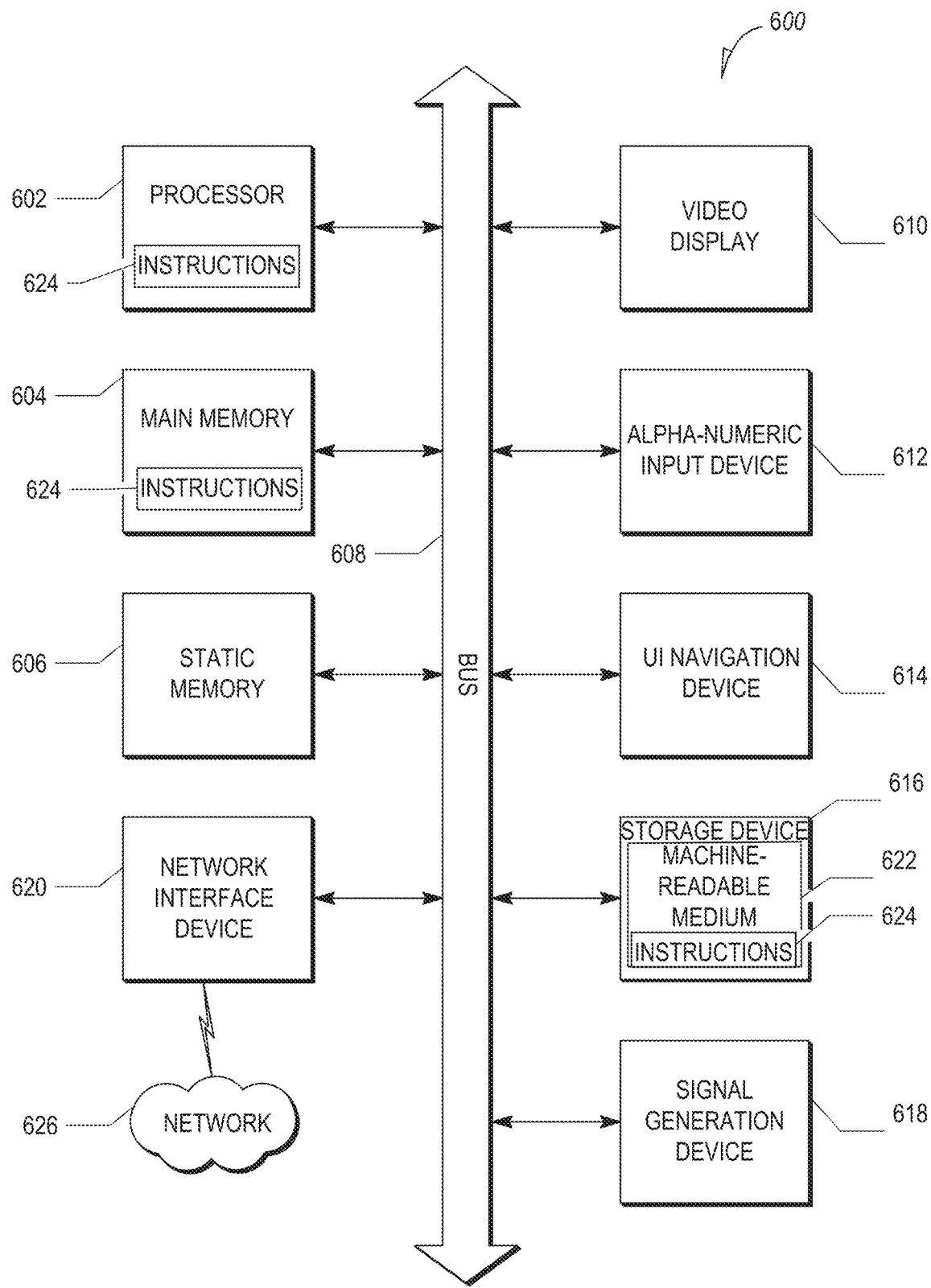
FIG. 6 is a block diagram illustrating a computing device hardware architecture, within which a set or sequence of instructions can be executed to cause a machine to perform examples of any one of the methodologies discussed herein.

FIG. 6 is a block diagram illustrating a computing device hardware architecture 600, within which a set or sequence of instructions can be executed to cause a machine to perform examples of any one of the methodologies discussed herein. The hardware architecture 600 describes a computing device for executing the vehicle autonomy system, described herein.

The architecture 600 may operate as a standalone device or may be connected (e.g., networked) to other machines. In a networked deployment, the architecture 600 may operate in the capacity of either a server or a client machine in server-client network environments, or it may act as a peer machine in peer-to-peer (or distributed) network environments. The architecture 600 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 600 includes a processor unit 602 comprising at least one processor (e.g., a central processing unit (CPU), a graphics processing unit (GPU), or both, processor cores, compute nodes). The architecture 600 may further comprise a main memory 604 and a static memory 606, which communicate with each other via a link 608 (e.g., bus). The architecture 600 can further include a video display unit 610, an input device 612 (e.g., a keyboard), and a UI navigation device 614 (e.g., a mouse). In some examples, the video display unit 610, input device 612, and UI navigation device 614 are incorporated into a touchscreen display. The architecture 600 may additionally include a storage device 616 (e.g., a drive unit), a signal generation device 618 (e.g., a speaker), a network interface device 620, and one or more sensors (not shown), such as a Global Positioning System (GPS) sensor, compass, accelerometer, or other sensor.

In some examples, the processor unit 602 or another suitable hardware component may support a hardware interrupt. In response to a hardware interrupt, the processor unit 602 may pause its processing and execute an ISH for example, as described herein.

The storage device 616 includes a machine-readable medium 622 on which is stored one or more sets of data structures and instructions 624 (e.g., software) embodying or used by any one or more of the methodologies or functions described herein. The instructions 624 can also reside, completely or at least partially, within the main memory 604, within the static memory 606, and/or within the processor unit 602 during execution thereof by the architecture 600, with the main memory 604, the static memory 606, and the processor unit 602 also constituting machine-readable media.

Executable Instructions and Machine-Storage Medium

The various memories (i.e., 604, 606, and/or memory of the processor unit(s) 602) and/or storage device 616 may store one or more sets of instructions and data structures (e.g., instructions) 624 embodying or used by any one or more of the methodologies or functions described herein. These instructions, when executed by processor unit(s) 602 cause various operations to implement the disclosed examples.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the Computer-Readable Medium The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 can further be transmitted or received over a communications network 626 using a transmission medium via the network interface device 620 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A service arrangement system for assigning vehicles, comprising:
   at least one processor programmed to perform operations comprising:
      receiving complaint data indicating a complaint from a human user of a first vehicle during a transportation service, the first vehicle being an autonomous vehicle and the transportation service including moving a payload from a transportation service start point to a transportation service end point, the complaint describing a condition associated with the first vehicle;
      accessing an indication of a rate of the complaint associated with a second vehicle;
      selecting the second vehicle to complete the transportation service based at least in part on the rate of the complaint associated with the second vehicle; and
      sending a transportation service instruction to the second vehicle, the transportation service instruction to cause the second vehicle to travel to a rendezvous location to meet the first vehicle and transport the payload from the rendezvous location to the transportation service end point.

2. The service arrangement system of claim 1, the complaint being of a first type, the operations further comprising determining that the second vehicle is less likely to receive complaints of the first type than the first vehicle.

3. The service arrangement system of claim 1, the complaint being of a first type, the operations further comprising comparing a rate of the first type of complaints for the second vehicle to a reference rate.

4. The service arrangement system of claim 1, the operations further comprising determining that the complaint is associated with a roadway location, the selecting of the second vehicle being based at least in part on a property of the roadway location.

5. The service arrangement system of claim 1, the operations further comprising:
   determining a roadway location associated with a location of the complaint, and
   determining that a cost associated with the roadway location for the second vehicle is less than a cost associated with the roadway location for the first vehicle.

6. The service arrangement system of claim 1, the complaint describing a current location of the first vehicle, the selecting of the second vehicle being based at least in part on a current location of the second vehicle and the current location of the first vehicle.

7. The service arrangement system of claim 1, wherein the payload comprises a human passenger, the complaint originating from the human passenger.

8. The service arrangement system of claim 1, the operations further comprising accessing payload preference data indicating a vehicle preference associated with the payload, wherein the selecting of the second vehicle is based at least in part on determining that the second vehicle is described by the vehicle preference.

9. The service arrangement system of claim 1, wherein the selecting of the second vehicle is based at least in part on determining, by the service arrangement system, that the second vehicle is of a vehicle type that has completed more than a threshold quantity of service.

10. A method of dispatching vehicles, the method comprising:
    receiving, by a service arrangement system, complaint data indicating a complaint from a human user of a first vehicle during a transportation service, the first vehicle being an autonomous vehicle and the transportation service including moving a payload from a transportation service start point to a transportation service end point, the complaint describing a condition associated with the first vehicle;
    accessing an indication of a rate of the complaint associated with a second vehicle;
    selecting, by the service arrangement system, the second vehicle to complete the transportation service based at least in part on the rate of the complaint associated with the second vehicle; and
    sending, by the service arrangement system to the second vehicle, a transportation service instruction to cause the second vehicle to travel to a rendezvous location to meet the first vehicle and transport the payload from the rendezvous location to the transportation service end point.

11. The method of claim 10, the complaint being of a first type, the method further comprising determining, by the service arrangement system, that the second vehicle is less likely to receive complaints of the first type than the first vehicle.

12. The method of claim 10, the complaint being of a first type, the method further comprising comparing, by the service arrangement system, a rate of the first type of complaints for the second vehicle to a reference rate.

13. The method of claim 10, further comprising determining that the complaint is associated with a roadway location, the selecting of the second vehicle being based at least in part on a property of the roadway location.

14. The method of claim 10, further comprising:
determining, by the service arrangement system, a roadway location associated with a location of the complaint; and
determining, by the service arrangement system, that a cost associated with the roadway location for the second vehicle is less than a cost associated with the roadway location for the first vehicle.

15. The method of claim 10, the complaint describing a current location of the first vehicle, the selecting of the second vehicle being based at least in part on a current location of the second vehicle and the current location of the first vehicle.

16. The method of claim 10, wherein the payload comprises a human passenger, the complaint originating from the human passenger.

17. The method of claim 10, further comprising accessing payload preference data indicating a vehicle preference associated with the payload, wherein the selecting of the second vehicle is based at least in part on determining that the second vehicle is described by the vehicle preference.

18. A non-transitory machine-readable medium comprising instructions thereon that, when executed by at least one processor, causes the at least one processor to perform operations comprising:
receiving complaint data indicating a complaint from a human user of a first vehicle during a transportation service, the first vehicle being an autonomous vehicle and the transportation service including moving a payload from a transportation service start point to a transportation service end point, the complaint describing a condition associated with the first vehicle;
accessing an indication of a rate of the complaint associated with a second vehicle;
selecting the second vehicle to complete the transportation service based at least in part on the rate of the complaint associated with the second vehicle; and
sending a transportation service instruction to the second vehicle, the transportation service instruction to cause the second vehicle to travel to a rendezvous location to meet the first vehicle and transport the payload from the rendezvous location to the transportation service end point.

* * * * *